UNITED STATES PATENT OFFICE.

THOMAS MILLER, OF SALT LAKE CITY, UTAH TERRITORY.

FLUX FOR SMELTING OR REDUCING ORES.

SPECIFICATION forming part of Letters Patent No. 456,311, dated July 21, 1891.

Application filed March 23, 1891. Serial No. 385,990. (No specimens.)

*To all whom it may concern:*

Be it known that I, THOMAS MILLER, a citizen of the United States, and a resident of the city and county of Salt Lake, in the Territory of Utah, have invented an Improved Flux for Smelting or Reducing Ores, of which the following is a specification.

My improved flux is adapted for reducing ores of various kinds as respects the metals contained therein, and of various grades of ore also. For example, it may be employed with good results on the hardest "milling ores;" but it yields the best results with fluxing ores, such as ores of copper containing silver and gold.

My flux consists of three ingredients, namely, a calcareous mineral found in the Territory of Utah, common salt, and charcoal. These ingredients are mixed in about the following proportions, viz: calcareous mineral, twenty pounds; common salt, one pound; charcoal, two pounds. These produce the best results when coarsely pulverized and mixed thoroughly together; and this compound may be then mixed with one hundred (100) pounds of the ore to be reduced. The mass is submitted to heat in an ordinary furnace and the temperature raised to the melting-point. The quantity of flux required will vary somewhat with the grade of ore; but this is a matter within the knowledge and experience of those skilled in the art of reducing ores. The proportions given above answer well for fluxing ores of copper containing silver and gold. The same proportions, substantially, may be used in reducing iron mineral rock, galena, and ores containing silver and lead.

In treating copper ores containing silver and gold with my flux the slag flows off in an unusually liquid form and leaves all the metal behind.

The calcareous mineral referred to as forming one of the constituents of my flux is found in two deposits, both in Utah Territory and within a few miles of Salt Lake City. One of these deposits is about east-northeast from said city, distant about three and one-half miles, in Dry Cañon, at the intersection of sections 27 and 28, 33 and 34, T. 1 N. R. 1 E. The other deposit is southeast of said city, distant about five and one-half miles, in Parley's Cañon, at the intersection of sections 23 and 24, 25 and 26, T. 1 S. R. 1 E. This mineral is shown by a careful analysis to contain the following components:

|   | Per cent. |
|---|---|
| Silica | 21.517 |
| Lime | 33.836 |
| Magnesia | 3.255 |
| Carbonic acid | 27.073 |
| Oxide of iron | 2.971 |
| Alumina | 7.037 |
| Oxide of manganese | 0.073 |
| Phosphoric acid | 0.080 |
| Sulphuric acid | 0.200 |
| Water | 0.641 |
| Hydrofluoric acid, alkalies, and organic matter | 3.317 |
| Total | 100.000 |

I do not give the rationale of the process of smelting with the flux described, as I do not know the chemical reactions resulting therefrom.

Having thus described my invention, I claim—

The flux for reducing ores described herein, the same consisting of common salt, charcoal, and the native calcareous mineral described herein, said mineral consisting of lime, carbonic acid, and silica as its principal ingredients and of magnesia, oxide of iron, alumina, oxide of manganese, and phosphoric acid in lesser proportions, as set forth.

In witness whereof I have hereunto signed my name in the presence of two subscribing witnesses.

THOMAS MILLER. [L. S.]

Witnesses:
 BERNHARD H. SCHOTTLER,
 OVANDO C. BEEBE.